United States Patent
Sonawane et al.

(10) Patent No.: US 12,373,177 B1
(45) Date of Patent: Jul. 29, 2025

(54) AUTOMATED BACKEND BACKGROUND TESTING OF WEBPAGES

(71) Applicant: BrowserStack Limited, Dublin (IE)

(72) Inventors: Suyash Yogeshwar Sonawane, Nashik (IN); Yohan Pereira, Mumbai (IN); Jimesh Chokshi, Mumbai (IN)

( * ) Notice: Subject to any disclaimer, the term of this patent is extended or adjusted under 35 U.S.C. 154(b) by 0 days.

(21) Appl. No.: 19/025,662

(22) Filed: Jan. 16, 2025

(51) Int. Cl.
  *G06F 8/40* (2018.01)
  *G06F 8/41* (2018.01)

(52) U.S. Cl.
  CPC ................. *G06F 8/41* (2013.01)

(58) Field of Classification Search
  CPC .................................................. G06F 8/41
  USPC ........................................................ 717/140
  See application file for complete search history.

(56) References Cited

U.S. PATENT DOCUMENTS

| | | | |
|---|---|---|---|
| 2014/0059522 A1* | 2/2014 | Chandra | G06F 11/3684 717/126 |
| 2023/0038691 A1* | 2/2023 | Walia | G06F 40/274 |

\* cited by examiner

*Primary Examiner* — Hanh Thi-Minh Bui
(74) *Attorney, Agent, or Firm* — Cognition IP, P.C.; Edward Steakley; Saleh Kaihani (57) ABSTRACT

A software development and testing platform (SDTP) includes a browser extension, allowing a developer to run manual or automatic tests on a website. At the same time, a feature of the extension allows for performing automatic background tests, as the developer test workflow generates various webpages of the website. The SDTP captures the webpages, generates copies of the webpages in a backend server and runs background tests on the copies. The background tests, running on webpage copies do not interfere with the developer test workflow in the frontend.

12 Claims, 4 Drawing Sheets

AUTOMATED BACKEND BACKGROUND TESTING OF WEBPAGES

BACKGROUND

Field

This invention relates generally to website development tools, and more particularly to tools directed to automatic background testing of a webpage.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Developers can use native features of commercial browsers to inspect the code of a website. A browser's native tools, however, can be limited in their functionality. Developers can benefit from tools that can attach to a browser, for example, in the form of a browser extension and help them inspect and debug a website. Browser extension tools that can automate any part of testing and failure reporting can significantly improve and expedite website development.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A software development and testing platform (SDTP) can provide user interface elements for a developer to run test workflows, and otherwise interact with a webpage and observe the webpage response in the user interface element. For example, most browsers provide an "inspect" functionality, which allows the developer to view a webpage and the software code from which the webpage is rendered in parallel. A robust SDTP can provide additional features beyond default browser functionality. For example, the SDTP can allow the developer to perform manual or automated workflow testing for various functionality in a website. For some workflow testing, the developer observes the behavior or response of various webpages of a website, relative to an anticipated user workflow. For example, a testing workflow can target the shopping cart feature of a website. The workflow can be manual or automated, but they both can follow the steps a user might be expected to undertake when interacting the shopping cart feature of the website. For example, the user might add a product to the shopping cart, change quantity, add more items, remove some items, view a total, and check out the items in the shopping cart. The developer might perform the same steps manually or automatically to test the website.

At the same time, the SDTP can provide some testing automatically as background operations. In this manner, while the developer can run a testing workflow, the SDTP can run additional testing in the background to provide more testing and development data to the developer. A good candidate for such background testing is a website or webpage level of compliance with accessibility requirements and features. When the developer is executing a testing workflow, he might not necessarily be concerned with whether the webpage includes accessibility features to make the webpage or website accessible to all segments of the population. In some cases, the developer's expertise and focus may be in a narrow area of the technology, potentially excluding other important aspects of developing a comprehensively robust website. For example, many developers are adept at debugging code but may not necessarily be familiar with the nuances of testing and developing the accessibility features of a website. In these and similar scenarios, an automated background testing feature can augment the tests and workflows actively performed by the developer.

Background testing of a webpage or website can interfere with the developer's testing workflow. For example, testing accessibility features can include scrolling a webpage, zooming in and out, taking screenshots, activating various tabs and/or otherwise interacting with the user interface (UI) elements, presented on a webpage, and running accessibility test scripts to determine the level of compliance of a webpage with a set of accessibility rules. These actions can interfere with the testing workflow of a developer. In this sense, the accessibility testing cannot be performed as background operations, as it would have to stop the developer workflow, or wait for the developer testing workflow to conclude. The described embodiments relate to enabling a background testing functionality, which can execute automated testing, without interfering with a developer testing workflow. Furthermore, the described background testing is performed in parallel with a testing workflow performed by the developer. As an example, the developer can be testing the shopping cart functionality of a website (or any other functionality), interacting with the website and visiting various webpages, within the website, while the automated background testing can run accessibility testing on the webpages generated or visited by the developer. The results of the accessibility testing are collected in the background, deduplicated, summarized, and presented to the developer.

Figure 1:
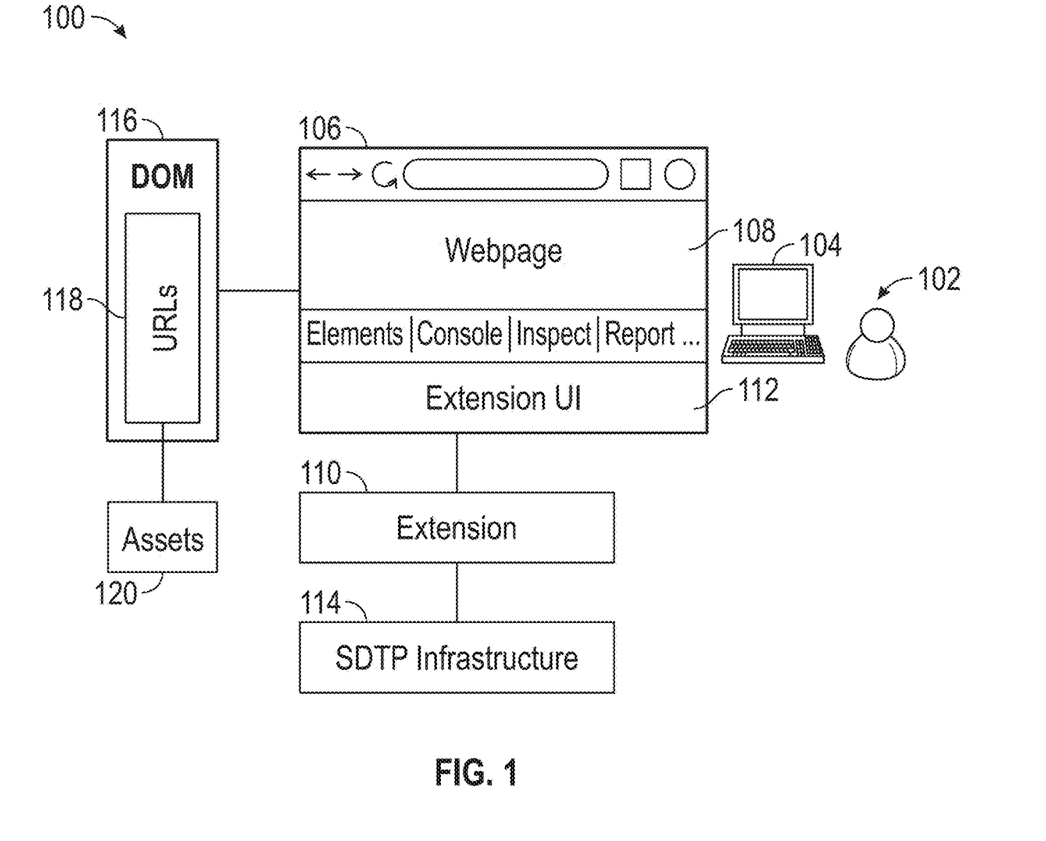
FIG. 1 illustrates an environment of a software development and testing platform (SDTP), according to an embodiment.

FIG. 1 illustrates an environment of a software development and testing platform (SDTP) 100, according to an embodiment. A developer 102 uses a local computing device, such as a computer 104 to perform software development and testing. The developer can use a browser 106 to load a webpage 108. The webpage 108 can be a page in a website in which the developer 102 is interested in performing testing and development activity. The SDTP can enable or include an extension 110, within the browser 106. The SDTP extension 110 can include an extension user interface (UI) 112 within the browser 106. The developer can access the functionality of the SDTP from the extension UI 112. Example SDTP functionality provided by the extension UI 112 can include providing menu options for inspecting the webpage 108, running tests, viewing test results, selecting report options and other functionality related to test and development activity, using the extension 110. The extension 110 is supported and/or is a part of an SDTP infrastructure 114.

Behind the scenes the webpage 108 is powered by a document object model (DOM) 116, various uniform resource locator (URL) addresses 118, and assets 120 to which the URLs point. Various elements in the webpage 108 may include links or URLs to webpages or assets 120. The Document Object Model (DOM) 116 connects webpages to scripts or programming languages by representing the structure of a webpage document, such as a hypertext markup language (HTML) representing a web page, in memory. DOM 116 can sometimes refer to JavaScript code, even though modeling HTML, scalable vector graphics (SVG), or extensible markup language (XML) documents as objects are not part of the core JavaScript language. The DOM 116 can represent a document webpage with a logical tree. A change or an interaction with the webpage 108 can lead to a change in DOM 116. For example, clicking on a user interface element on the webpage 108 can change the appearance of the webpage 108, which can render in the browser 106 as a different webpage 108, but is also reflected as a change in the DOM 116. An asset 120 can refer to any resource that is loaded or used by the web page 108. Assets 120 can include external files such as images, videos, cascading style sheets (CSS), JavaScript, fonts, and other files, including multimedia or static files. The assets 120 are components for rendering and interacting with the webpage 108. One interest of the developer 102 is to test and develop the webpage 108, with a given list of assets 120, to render and behave the same way, or nearly the same way, across different environments.

Background testing if performed on the webpage 108 can interfere with any testing workflow being performed by the developer 102, using the extension UI 112. For example, performing background accessibility testing can include scrolling the webpage 108, cycling through webpage UI elements, such as tabs, zooming in and out, taking screenshots and other actions. These types of actions can interfere with the testing workflow of the developer 102, as the developer testing workflow can also include navigating the webpage 108 and interacting with it. The SDTP can configure the extension 110 and the SDTP infrastructure 114 to run background testing, including for example, accessibility testing on a backend copy of the webpage 108, without interfering with the developer 102 performing a different testing workflow, on the browser-side webpage 108, using the extension UI 112. Furthermore, the background testing is performed in parallel to the browser-side testing. As the developer loads various webpages 108, the background testing is performed on a backend copy of those webpages. In this manner, the background testing is synchronized or semi-synchronized with the browser-side testing performed by the developer 102.

Figure 2:
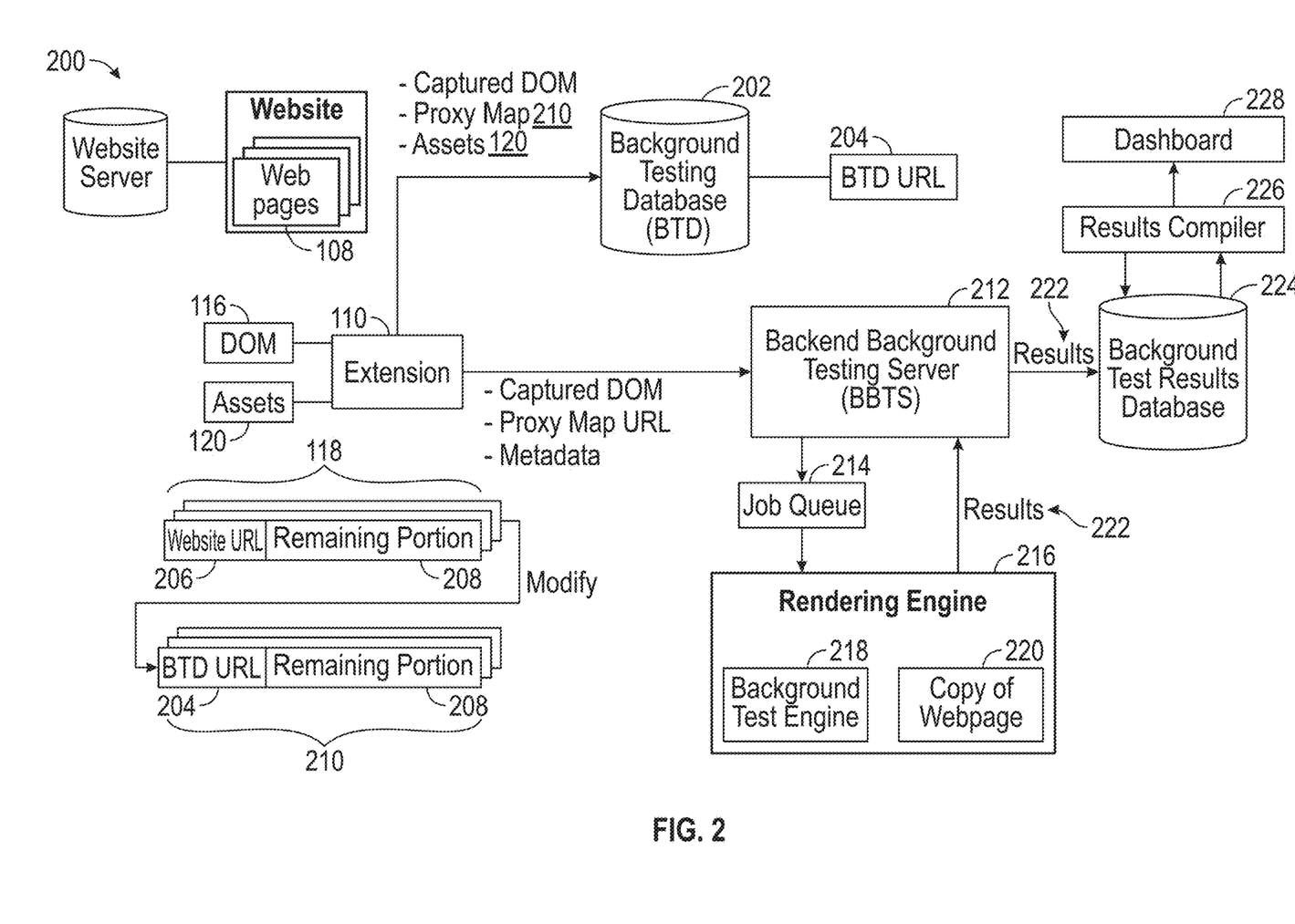
FIG. 2 illustrates a block diagram of the components of the SDTP used to perform automated background testing.

FIG. 2 illustrates a block diagram 200 of the components of the SDTP used to perform automated background testing. The extension 110 monitors the DOM 116. The extension 110 can capture the DOM 116 when there is a change in the DOM 116. The change in DOM 116 can occur, for example, based on the developer 102 performing a manual or automated testing workflow on the webpage 108, or when there is a change in the state of the webpage 108. The extension 110 also captures the assets 120, corresponding to the captured DOM. The DOM can include the URLs of the assets 120 and the URLs that are referenced and used in rendering the webpage 108. In some embodiments, the extension 110 monitors network requests issued from the browser 106 to determine the assets 120 corresponding to the webpage 108. The extension 110 can upload the captured DOM to a background testing database (BTD) 202. The BTD can include a BTD URL address 204. The extension 110 can generate a proxy map, based on the BTD URL address 204.

The URLs 118 of the assets 120 can include a portion that identifies the website server of the webpage 108, as a terminal point, when the URL 118 is accessed. In other words, the website server portion of the URL 118 accesses the server of the website of the webpage 108, which in turn accesses the webpage 108. To prevent the backend from accessing the frontend webpage 108, when generating a copy of the webpage 108, the extension 110 generates a proxy map that modifies the website portion of the URLs 118. In other words, the URL 118 of an asset 120 has a website portion 206 along with a remaining portion 208 that together identify the asset, and the server from which the asset can be accessed. The website portion 206 of the URL 118 can include the name, or URL, of the website server, which renders the webpage 108 in the browser 106 at the frontend. The extension 110 can generate a proxy map, which maintains the mappings of the assets 120, and the elements of the webpage 108, while replacing the website portion 206 of the URLs 118 with the URL address of the BTD 202 (e.g., BTD URL 204). The extension 110 leaves the remaining portions 208 of the URLs 118, unchanged. The proxy map 210, generated in this manner, is a list of URLs, each having a BTD URL 204 portion, as the top server, and a remaining portion 208. In this manner, a backend browser accessing a proxy map 210, accesses the background testing database (BTD) 202, instead of the website server of the webpage 108, to fetch the corresponding assets 120.

In some embodiments, the extension 110, can modify the captured DOM, for example, based on the proxy map. In other embodiments, the captured DOM can be left unchanged. The extension 110 can upload the captured DOM, the corresponding proxy map and the corresponding assets 120 to the BTD 202. Furthermore, the extension 110 can send a URL of the proxy map to a backend background testing server (BBTS) 212, along with the captured DOM and metadata. In some embodiments, the extension 110 can send a URL of the captured DOM as opposed to the captured DOM. The metadata can include any additional data that may be useful to more faithfully generate a copy of the webpage 108 in the backend. For example, the metadata can include height, width, resolution, or other display information. Any other data relevant to generating a faithful copy of the webpage 108 can be sent to the BBTS 212, as metadata. In practice, the proxy map 210 can be a large element, containing hundreds and sometimes thousands of URLs 210. Instead of passing a large proxy map 210 to the BBTS 212, the proxy map 210 can be kept at the BTD 202, and only a URL of the proxy map 210 can be passed on to the BBTS 212, instructing or allowing the BBTS 212 or its subcomponents to access the proxy map 210 by accessing the BTD 202.

The BBTS 212 can push the captured DOM and the proxy map URL to a job queue 214. In other words, the job queue 214 can include groupings of captured DOMs, and their corresponding proxy map URLs, and metadata. The job queue 214 allows the BBTS 212 to run background testing on various copies of the webpages 108 out of sync from the webpages 108 the developer 102 may be downloading into the browser 106 in the frontend. The job queue 214 can be used to prioritize background testing of the different webpages 108, and perform some before the others, depending on priorities set by the developer 102. The BBTS 212 can also include a rate limiting feature that can be used to limit the number of jobs that are pushed in the job queue 214. The extension 110 can capture the DOM whenever there is a change in the status of the DOM 116 and push the captured DOM into the BBTS 212. In this scenario, if the user performs an action or a series of action that can lead to too many DOM changes in a short time period, the BBTS 212 can be overwhelmed with too many jobs. To prevent or minimize a high rate of jobs in the BBTS 212, the BBTS 212 can be set up with a threshold to reject jobs and issue an alert when the rate limit feature is triggered.

The BBTS 212 can run a rendering engine 216. The rendering engine 216 fetches a job from the job queue 214. A job in the job queue 214 includes a captured DOM, a URL of a corresponding proxy map 210, and any corresponding metadata. The rendering engine can be implemented with a backend browser. The rendering engine 216 uses the captured DOM and the assets 120 stored in the BTD 202, as well as any corresponding metadata to generate a copy 220 of the webpage 108. The copy 220 uses the same DOM as the one the developer has used in the frontend to render the webpage 108 on the browser 106. The BBTS 212 can also download one or more background testing scripts or rules from the BTD 202, and enable a background test engine 218 to execute those background tests on the copy 220. The background tests can be any tests that can automatically run in the background. For example, when the background test engine 218 is configured to execute accessibility testing scripts, it can check for accessibility issues in the copy 220, such as proper font sizes, spacing, read-aloud features and other accessibility-related requirements.

The rendering engine 216 can return the results 222 of the background tests to the BBTS 212. The BBTS 212 pushes the results 222 into a background test results database 224. A results compiler 226 can process the results 222. The processing can include deduplicating the results, collating the results and summarizing the results. The results compiler 226 can also generate one or more reports, based on the results 222. The results compiler 226 can push the compiled results to a dashboard 228. The dashboard 228 can be a UI element within the extension 110 to allow the developer 102 to view the compiled results.

Figure 3:
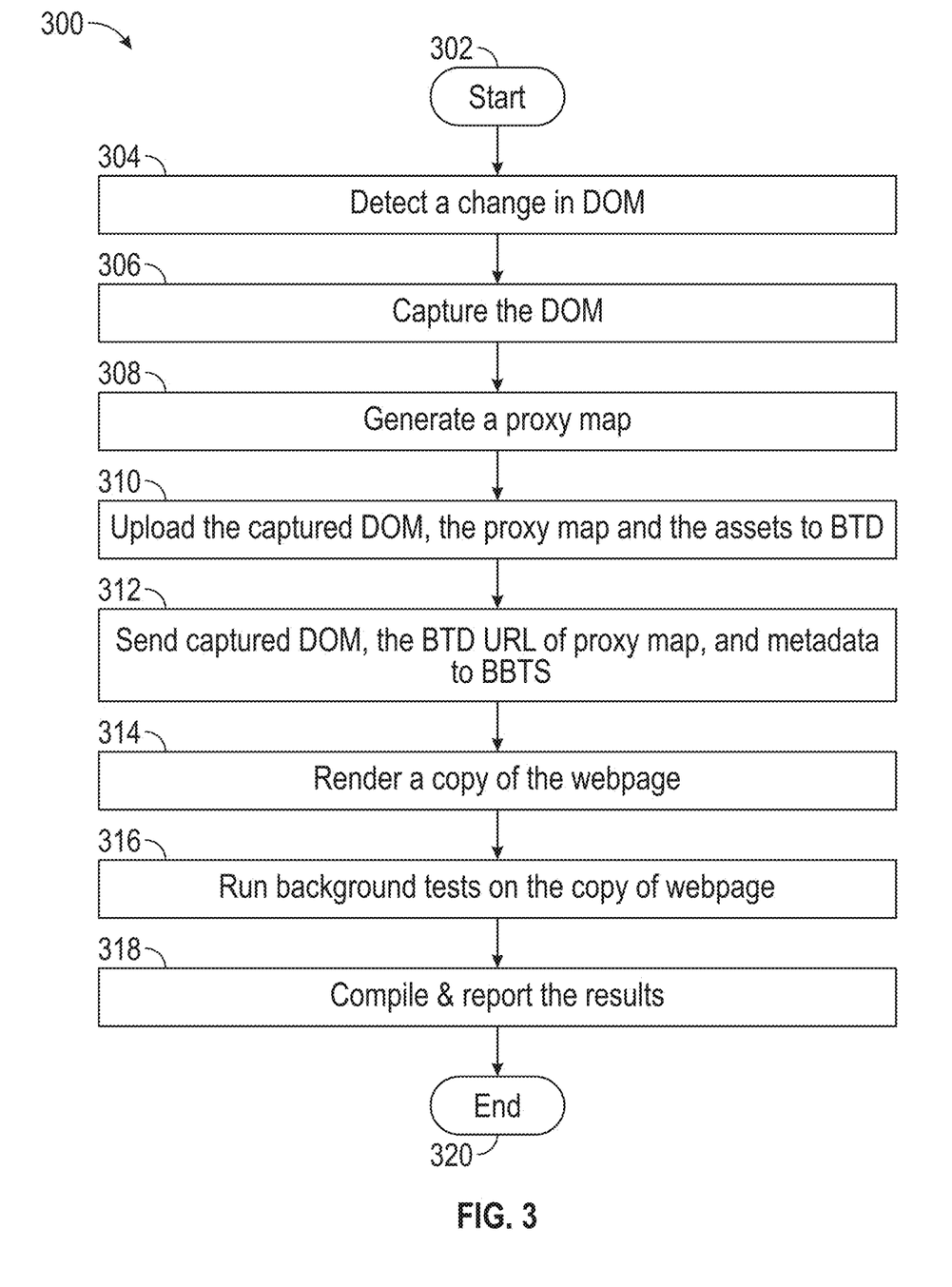
FIG. 3 illustrates a flowchart of a method of performing background testing according to an embodiment.

FIG. 3 illustrates a flowchart of a method 300 of performing background testing according to an embodiment. The method starts at step 302. Step 304 includes detecting a change in the DOM of a webpage. Step 306 includes capturing the DOM, when a change in the state of the DOM is detected. Step 308 includes identifying the corresponding assets and their URLs, relative to a captured DOM, and generating a proxy map. The proxy map is in part generated by replacing the website portion of every URL with the URL of a background testing database (BTD) 202. Step 310 includes uploading the captured DOM, the proxy map and the assets to the BTD. Step 312 includes sending the captured DOM, a URL or address of the proxy map in the BTD, and webpage metadata to a backend background testing server (BBTS) 212. Step 314 includes generating a copy of the webpage, using the captured DOM, and the URL address of the corresponding proxy map. The assets referenced by the proxy map are also downloaded from the BTD 202. In some embodiments, generating the copy of the webpage includes, intercepting a DOM call to an asset, determining a URL In the proxy map corresponding to that asset, using the determined URL in the proxy map to fetch the asset from the BTD, and generating the copy of the webpage, based at least in part on the fetched asset.

Step 316 includes executing one or more background test scripts on the copy of the webpage. The results are stored in a background test results database 224. Steps 304 through 316 can be performed multiple times and the results accumulated in the background test results database 224. Step 318 includes compiling the results accumulated in the background test results database 224 and generating one or more reports, based on the compiled results. The compiled results can be pushed to a dashboard for the developer 102 to view and analyze. The method ends at step 320.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 4:
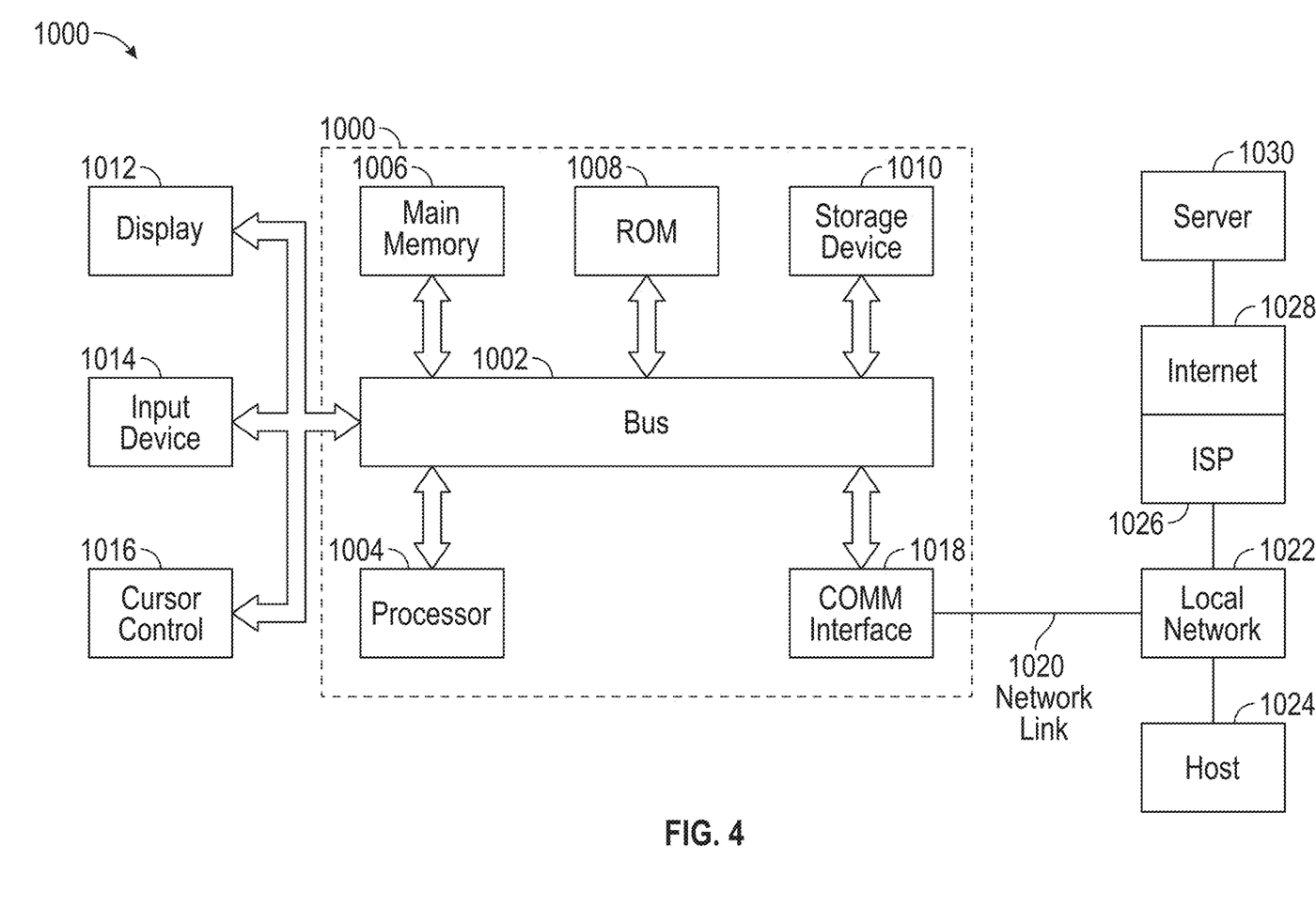
FIG. 4 illustrates an environment in which some embodiments may operate.

For example, FIG. 4 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: monitoring a webpage, and a DOM associated with the webpage; capturing the DOM when a change in status of the DOM occurs; identifying uniform resource locator (URL) addresses of a plurality of assets referenced in the captured DOM; identifying the assets referenced in the DOM; uploading the captured DOM to a background testing database (BTD); uploading the identified assets to the BTD; generating a proxy map, based on the identified URL addresses of the assets, wherein the proxy map comprises the URL of the assets, with a top server of the URL replaced with URL address of the BTD; uploading the proxy map to the BTD, the proxy map uploaded in the BTD, having a proxy map URL, referencing the proxy map in the BTD; providing the proxy map URL to a backend background testing server (BBTS); providing the captured DOM to the BBTS; the BBTS, accessing the BTD, and generating a copy of the webpage in a rendering engine, based at least in part on the proxy map in the BTD, the assets in the BTD, and the captured DOM; executing one or more test scripts on the copy of the webpage in the rendering engine; storing results of the one or more tests in a background test results database; compiling the results; pushing the compiled results to a dashboard user interface; and displaying the compiled results in the dashboard user interface.

Example 2: The method of Example 1, wherein compiling the results comprises deduplicating the results.

Example 3: The method of some or all of Examples 1 and 2, wherein generating a copy of the webpage comprises: intercepting a DOM call to an asset; determining a URL in the proxy map corresponding to the asset; and using the determined URL in the proxy map, fetching the asset from the BTD and generating the copy of the webpage, based on the fetched asset.

Example 4: The method of some or all of Examples 1-3, further comprising: recapturing the DOM, when a change in state of the DOM occurs; regenerating a copy of the website; re-executing the one or more test scripts on the regenerated copy; and storing the results in the background test results database.

Example 5: The method of some or all of Examples 1-4, wherein the BBTS rate limits the number of captured DOMs the rendering engine receives.

Example 6: A non-transitory computer storage medium that stores executable program instructions that, when executed by one or more computing devices, configure the one or more computing devices to perform operations comprising: monitoring a webpage, and a DOM associated with the webpage; capturing the DOM when a change in status of the DOM occurs; identifying uniform resource locator (URL) addresses of a plurality of assets referenced in the captured DOM; identifying the assets referenced in the DOM; uploading the captured DOM to a background testing database (BTD); uploading the identified assets to the BTD; generating a proxy map, based on the identified URL addresses of the assets, wherein the proxy map comprises the URL of the assets, with a top server of the URL replaced with URL address of the BTD; uploading the proxy map to the BTD, the proxy map uploaded in the BTD, having a proxy map URL, referencing the proxy map in the BTD; providing the proxy map URL to a backend background testing server (BBTS); providing the captured DOM to the BBTS; the BBTS, accessing the BTD, and generating a copy of the webpage in a rendering engine, based at least in part on the proxy map in the BTD, the assets in the BTD, and the captured DOM; executing one or more test scripts on the copy of the webpage in the rendering engine; storing results of the one or more tests in a background test results database; compiling the results; pushing the compiled results to a dashboard user interface; and displaying the compiled results in the dashboard user interface.

Example 7: The non-transitory computer storage of Example 6, wherein compiling the results comprises deduplicating the results.

Example 8: The non-transitory computer storage of some or all of Examples 6 and 7, wherein generating a copy of the webpage comprises: intercepting a DOM call to an asset; determining a URL in the proxy map corresponding to the asset; and using the determined URL in the proxy map, fetching the asset from the BTD and generating the copy of the webpage, based on the fetched asset.

Example 9: The non-transitory computer storage of some or all of Examples 6-8, wherein the operations further comprise: recapturing the DOM, when a change in state of the DOM occurs; regenerating a copy of the website; re-executing the one or more test scripts on the regenerated copy; and storing the results in the background test results database.

Example 10: The non-transitory computer storage of some or all of Examples 6-9, wherein the BBTS rate limits the number of captured DOMs the rendering engine receives.

Example 11: A system comprising one or more processors, wherein the one or more processors are configured to perform operations comprising: monitoring a webpage, and a DOM associated with the webpage; capturing the DOM when a change in status of the DOM occurs; identifying uniform resource locator (URL) addresses of a plurality of assets referenced in the captured DOM; identifying the assets referenced in the DOM; uploading the captured DOM to a background testing database (BTD); uploading the identified assets to the BTD; generating a proxy map, based on the identified URL addresses of the assets, wherein the proxy map comprises the URL of the assets, with a top server of the URL replaced with URL address of the BTD; uploading the proxy map to the BTD, the proxy map uploaded in the BTD, having a proxy map URL, referencing the proxy map in the BTD; providing the proxy map URL to a backend background testing server (BBTS); providing the captured DOM to the BBTS; the BBTS, accessing the BTD, and generating a copy of the webpage in a rendering engine, based at least in part on the proxy map in the BTD, the assets in the BTD, and the captured DOM; executing one or more test scripts on the copy of the webpage in the rendering engine; storing results of the one or more tests in a background test results database; compiling the results; pushing the compiled results to a dashboard user interface; displaying the compiled results in the dashboard user interface.

Example 12: The system of Example 11, wherein compiling the results comprises deduplicating the results.

Example 13: The system of some or all of Examples 11 and 12, wherein generating a copy of the webpage comprises: intercepting a DOM call to an asset; determining a URL in the proxy map corresponding to the asset; and using the determined URL in the proxy map, fetching the asset from the BTD and generating the copy of the webpage, based on the fetched asset.

Example 14: The system of some or all of Examples 11-13, wherein the operations further comprise: recapturing the DOM, when a change in state of the DOM occurs; regenerating a copy of the website; re-executing the one or more test scripts on the regenerated copy; and storing the results in the background test results database.

Example 15: The system of some or all of Examples 11-14, wherein the BBTS rate limits the number of captured DOMs the rendering engine receives.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
   monitoring a webpage, and a document object model (DOM) associated with the webpage;
   capturing the DOM when a change in status of the DOM occurs;
   identifying uniform resource locator (URL) addresses of a plurality of assets referenced in the captured DOM;
   identifying the assets referenced in the captured DOM;
   uploading the captured DOM to a background testing database (BTD);
   uploading the identified assets to the BTD;
   generating a proxy map, based on the identified URL addresses of the assets, wherein the proxy map comprises the URL of the assets, with a top server of the URL replaced with URL address of the BTD;
   uploading the proxy map to the BTD, the proxy map uploaded in the BTD, having a proxy map URL, referencing the proxy map in the BTD;
   providing the proxy map URL to a backend background testing server (BBTS);
   providing the captured DOM to the BBTS;
   the BBTS, accessing the BTD, and generating a copy of the webpage in a rendering engine, based at least in part on the proxy map in the BTD, the assets in the BTD, and the captured DOM, wherein generating the copy of the webpage comprises:
   intercepting a DOM call to an asset;
   determining the URL in the proxy map corresponding to the asset; and using the determined URL in the proxy map, fetching the asset from the BTD and generating the copy of the webpage, based on the fetched asset;

executing one or more test scripts on the copy of the webpage in the rendering engine;

storing results of the one or more test scripts in a background test results database;

compiling the results;

pushing the compiled results to a dashboard user interface; and displaying the compiled results in the dashboard user interface.

2. The method of claim 1, wherein compiling the results comprises deduplicating the results.

3. The method of claim 1, further comprising:
recapturing the DOM, when a change in state of the DOM occurs;
regenerating the copy of the website;
re-executing the one or more test scripts on the regenerated copy; and
storing the results in the background test results database.

4. The method of claim 1, wherein the BBTS limits number of the captured DOMs the rendering engine receives.

5. A non-transitory computer storage medium that stores executable program instructions that, when executed by one or more computing devices, configure the one or more computing devices to perform operations comprising:
monitoring a webpage, and a document object model (DOM) associated with the webpage;
capturing the DOM when a change in status of the DOM occurs;
identifying uniform resource locator (URL) addresses of a plurality of assets referenced in the captured DOM;
identifying the assets referenced in the captured DOM;
uploading the captured DOM to a background testing database (BTD);
uploading the identified assets to the BTD;
generating a proxy map, based on the identified URL addresses of the assets, wherein the proxy map comprises the URL of the assets, with a top server of the URL replaced with URL address of the BTD;
uploading the proxy map to the BTD, the proxy map uploaded in the BTD, having a proxy map URL, referencing the proxy map in the BTD;
providing the proxy map URL to a backend background testing server (BBTS);
providing the captured DOM to the BBTS;
the BBTS, accessing the BTD, and generating a copy of the webpage in a rendering engine, based at least in part on the proxy map in the BTD, the assets in the BTD, and the captured DOM, wherein generating the copy of the webpage comprises:
intercepting a DOM call to an asset;
determining the URL in the proxy map corresponding to the asset; and
using the determined URL in the proxy map, fetching the asset from the BTD and generating the copy of the webpage, based on the fetched asset;
executing one or more test scripts on the copy of the webpage in the rendering engine;
storing results of the one or more test scripts in a background test results database;
compiling the results;
pushing the compiled results to a dashboard user interface; and
displaying the compiled results in the dashboard user interface.

6. The non-transitory computer storage of claim 5, wherein compiling the results comprises deduplicating the results.

7. The non-transitory computer storage of claim 5, wherein the operations further comprise:
recapturing the DOM, when a change in state of the DOM occurs;
regenerating the copy of the website;
re-executing the one or more test scripts on the regenerated copy; and
storing the results in the background test results database.

8. The non-transitory computer storage of claim 5, wherein the BBTS limits number of captured DOMs the rendering engine receives.

9. A system comprising one or more processors, wherein the one or more processors are configured to perform operations comprising:
monitoring a webpage, and a document object model (DOM) associated with the webpage;
capturing the DOM when a change in status of the DOM occurs;
identifying uniform resource locator (URL) addresses of a plurality of assets referenced in the captured DOM;
identifying the assets referenced in the captured DOM;
uploading the captured DOM to a background testing database (BTD);
uploading the identified assets to the BTD;
generating a proxy map, based on the identified URL addresses of the assets, wherein the proxy map comprises the URL of the assets, with a top server of the URL replaced with URL address of the BTD;
uploading the proxy map to the BTD, the proxy map uploaded in the BTD, having a proxy map URL, referencing the proxy map in the BTD;
providing the proxy map URL to a backend background testing server (BBTS);
providing the captured DOM to the BBTS;
the BBTS, accessing the BTD, and generating a copy of the webpage in a rendering engine, based at least in part on the proxy map in the BTD, the assets in the BTD, and the captured DOM, wherein generating the copy of the webpage comprises:
intercepting a DOM call to an asset;
determining the URL in the proxy map corresponding to the asset; and
using the determined URL in the proxy map, fetching the asset from the BTD and generating the copy of the webpage, based on the fetched asset;
executing one or more test scripts on the copy of the webpage in the rendering engine;
storing results of the one or more test scripts in a background test results database;
compiling the results;
pushing the compiled results to a dashboard user interface; and
displaying the compiled results in the dashboard user interface.

10. The system of claim 9, wherein compiling the results comprises deduplicating the results.

11. The system of claim 9, wherein the operations further comprise:
recapturing the DOM, when a change in state of the DOM occurs;
regenerating the copy of the website;

re-executing the one or more test scripts on the regenerated copy; and storing the results in the background test results database.

12. The system of claim 9, wherein the BBTS limits number of captured DOMs the rendering engine receives.

* * * * *